(12) United States Patent
Brier et al.

(10) Patent No.: US 6,871,189 B2
(45) Date of Patent: *Mar. 22, 2005

(54) MUNICIPAL BOND APPARATUS PRODUCT AND METHOD

(76) Inventors: Daniel L. Brier, 33 Angelfish Cay Dr., Key Largo, FL (US) 33037; Frederick N. Brier, 1611 Bishop Hollow Run, Dunwoody, GA (US) 30338

(*) Notice: Subject to any disclaimer, the term of this patent is extended or adjusted under 35 U.S.C. 154(b) by 101 days.

This patent is subject to a terminal disclaimer.

(21) Appl. No.: 10/232,028

(22) Filed: Aug. 30, 2002

(65) Prior Publication Data

US 2003/0046205 A1 Mar. 6, 2003

Related U.S. Application Data

(63) Continuation of application No. 09/304,869, filed on May 4, 1999, now Pat. No. 6,446,047.
(60) Provisional application No. 60/084,573, filed on May 7, 1998.

(51) Int. Cl.[7] .............................................. G06F 17/60
(52) U.S. Cl. ...................................................... 705/35
(58) Field of Search ..................................... 705/35, 36

(56) References Cited

U.S. PATENT DOCUMENTS

| | | |
|---|---|---|
| 4,346,442 A | 8/1982 | Musmanno |
| 4,674,044 A | 6/1987 | Kalmus et al. .............. 705/37 |
| 4,722,055 A | 1/1988 | Roberts |
| 5,675,801 A | 10/1997 | Lindsey |
| 5,875,331 A | 2/1999 | Lindsey |
| 5,915,209 A | 6/1999 | Lawrence .................. 340/3.7 |
| 6,292,788 B1 | 9/2001 | Roberts et al. .............. 705/36 |
| 6,332,132 B1 * | 12/2001 | Halpern ...................... 705/36 |
| 6,446,047 B1 * | 9/2002 | Brier et al. .................. 705/35 |
| 6,622,129 B1 * | 9/2003 | Whitworth .................. 705/37 |

FOREIGN PATENT DOCUMENTS

JP      402294893 A      12/1990      ............ 340/825.27

OTHER PUBLICATIONS

"Bond Basics", Bond Buyer, Dec. 20, 1999.
Zweig, Jason, "Annual funds survey: Out of the frying pan", Forbes v156n5, Aug. 28, 1995, pp. 170–171.

* cited by examiner

*Primary Examiner*—Bryan Jaketic
(74) *Attorney, Agent, or Firm*—Adams Evans P.A.

(57) ABSTRACT

A data processing system for creating and administering a bond issue by a bond manager for a municipal taxing authority of a community. The apparatus includes a database configured to store for retrieval selected information regarding creation and administration of the bond issue, an element for storing and processing data representing information needed to determine bond utilization in the community governed by the municipal taxing authority, and an element for storing and processing data representing information about a specific real estate purchaser, the real estate to be purchased, the use to which the real estate will be put, and projected purchaser income and income growth to predict whether participation in a primary bond issue would be financially beneficial to the purchaser.

1 Claim, 14 Drawing Sheets

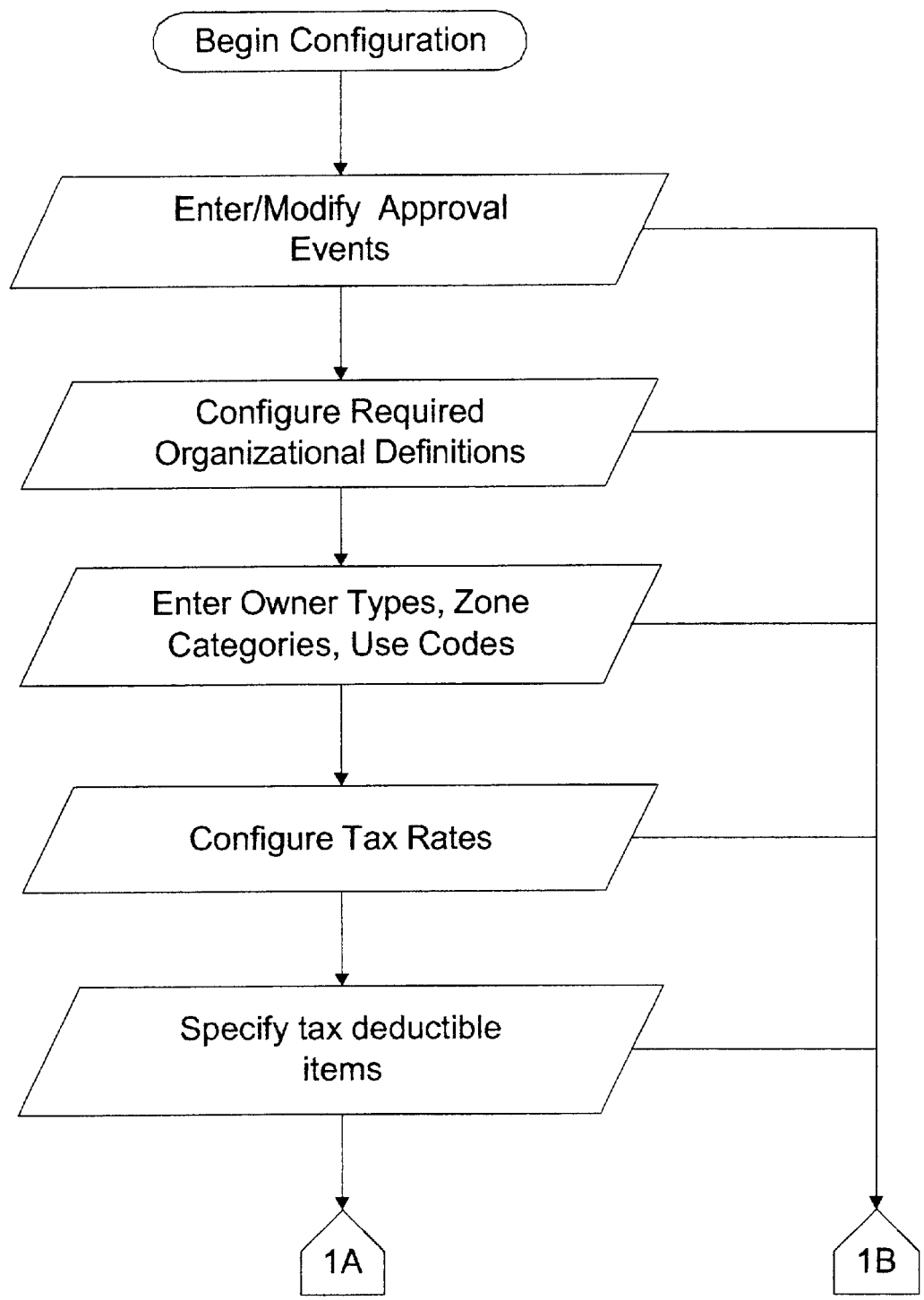
Fig. 1A: Municipality Configuration Process

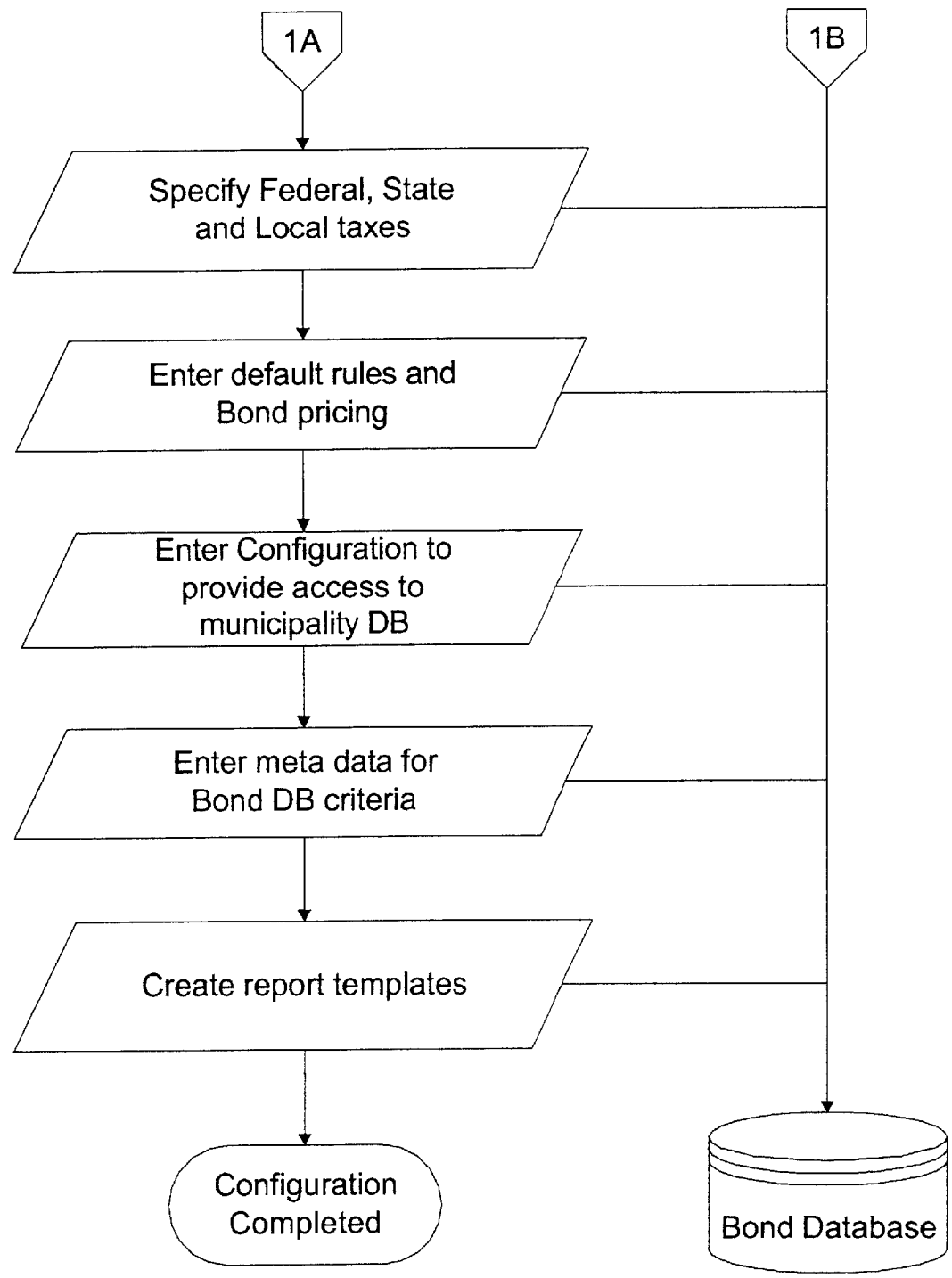
Fig. 1B: Municipality Configuration Process

Fig. 2A: Bond Offering Creation Process
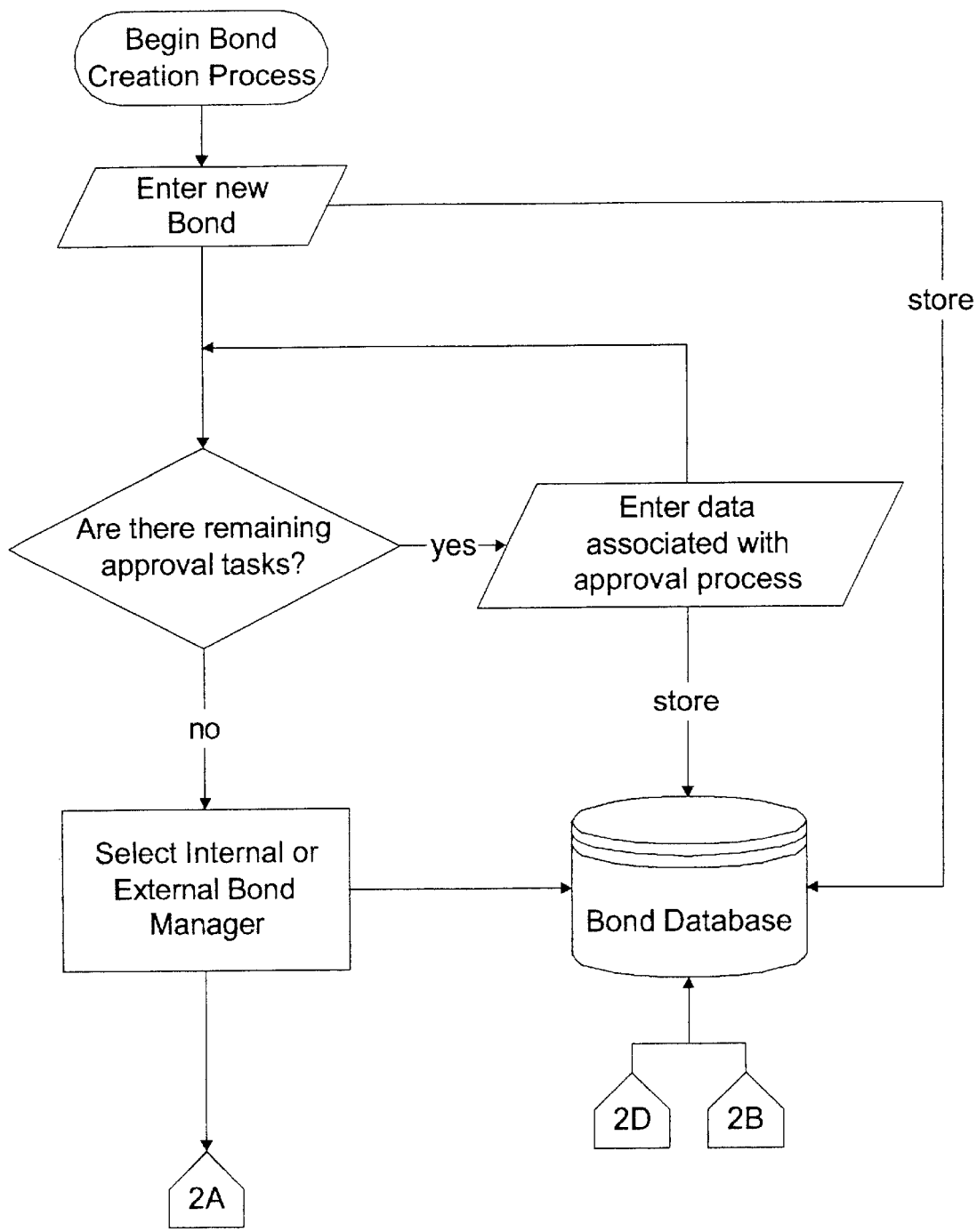

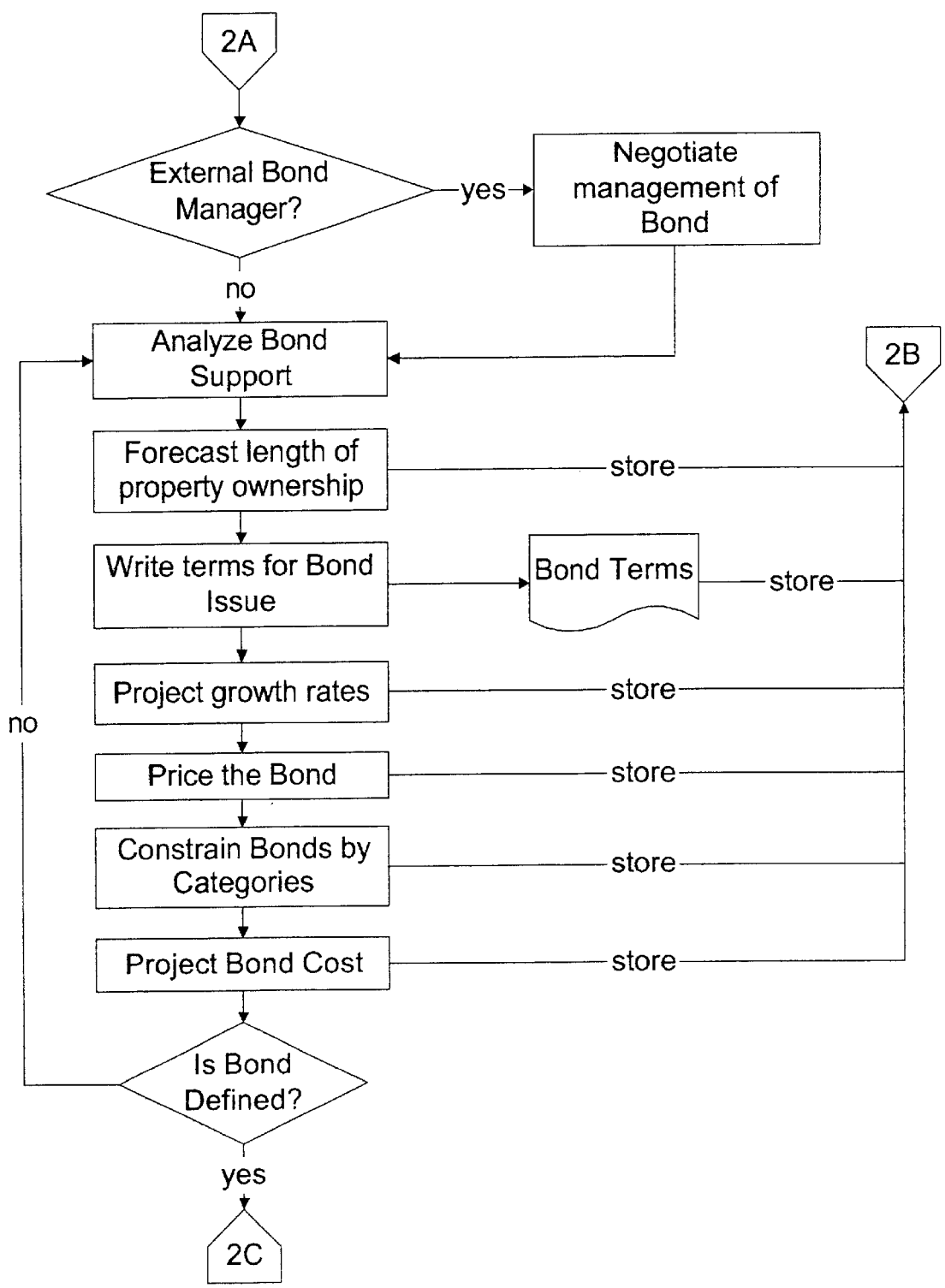
Fig. 2B: Bond Offering Creation Process

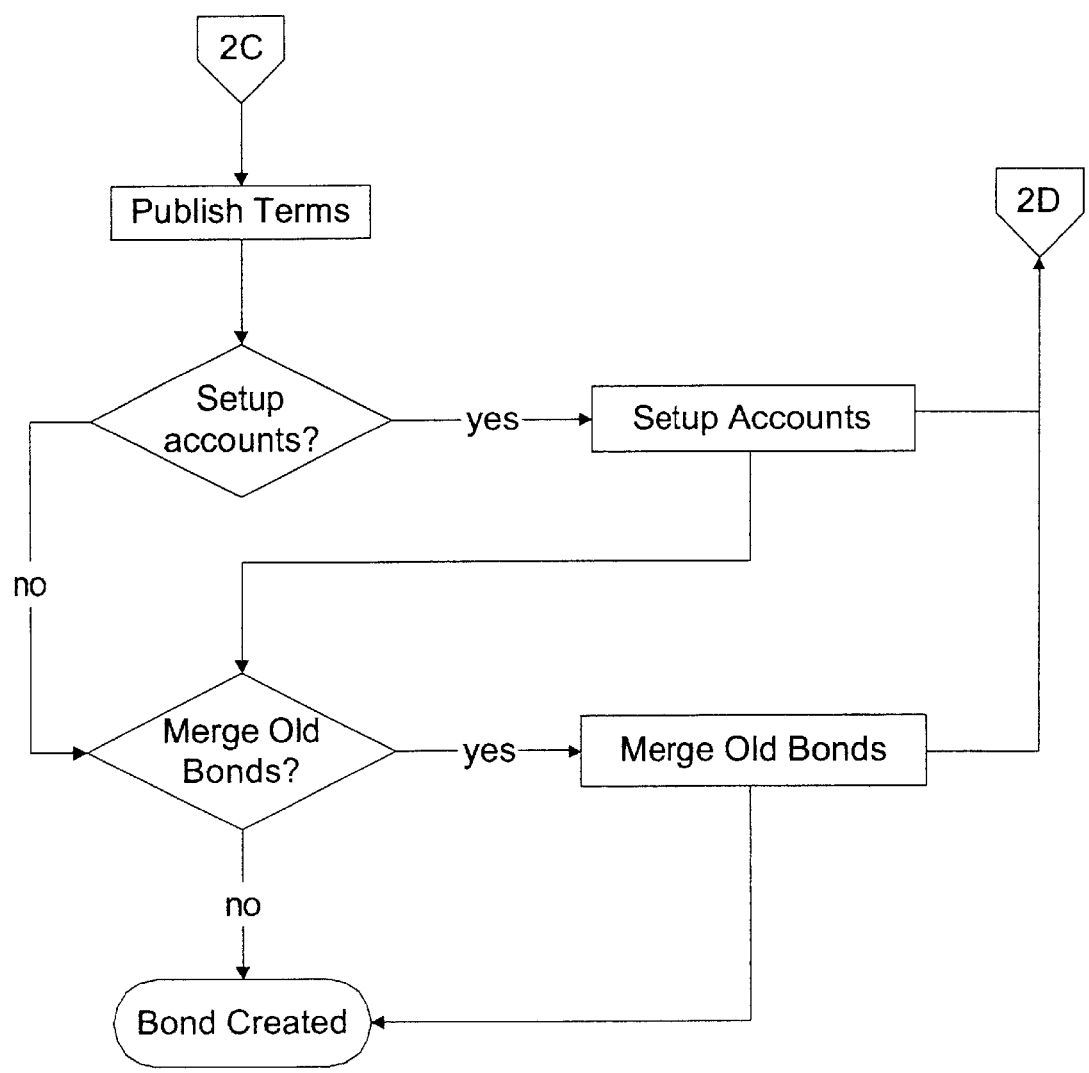
Fig. 2C: Bond Offering Creation Process

Fig. 3A: Primary Market: Bond Purchase Process
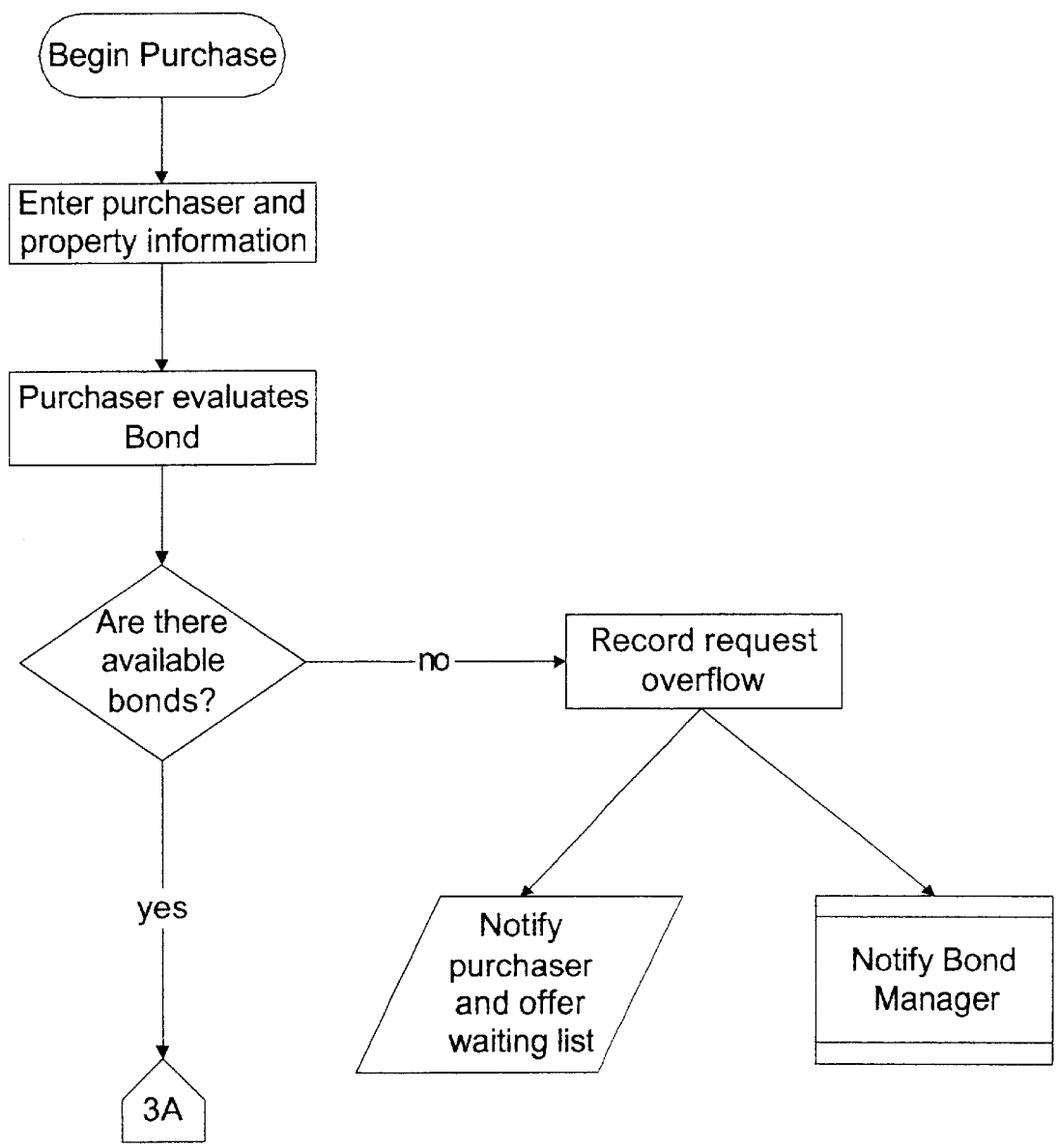

Fig. 3B: Primary Market: Bond Purchase Process
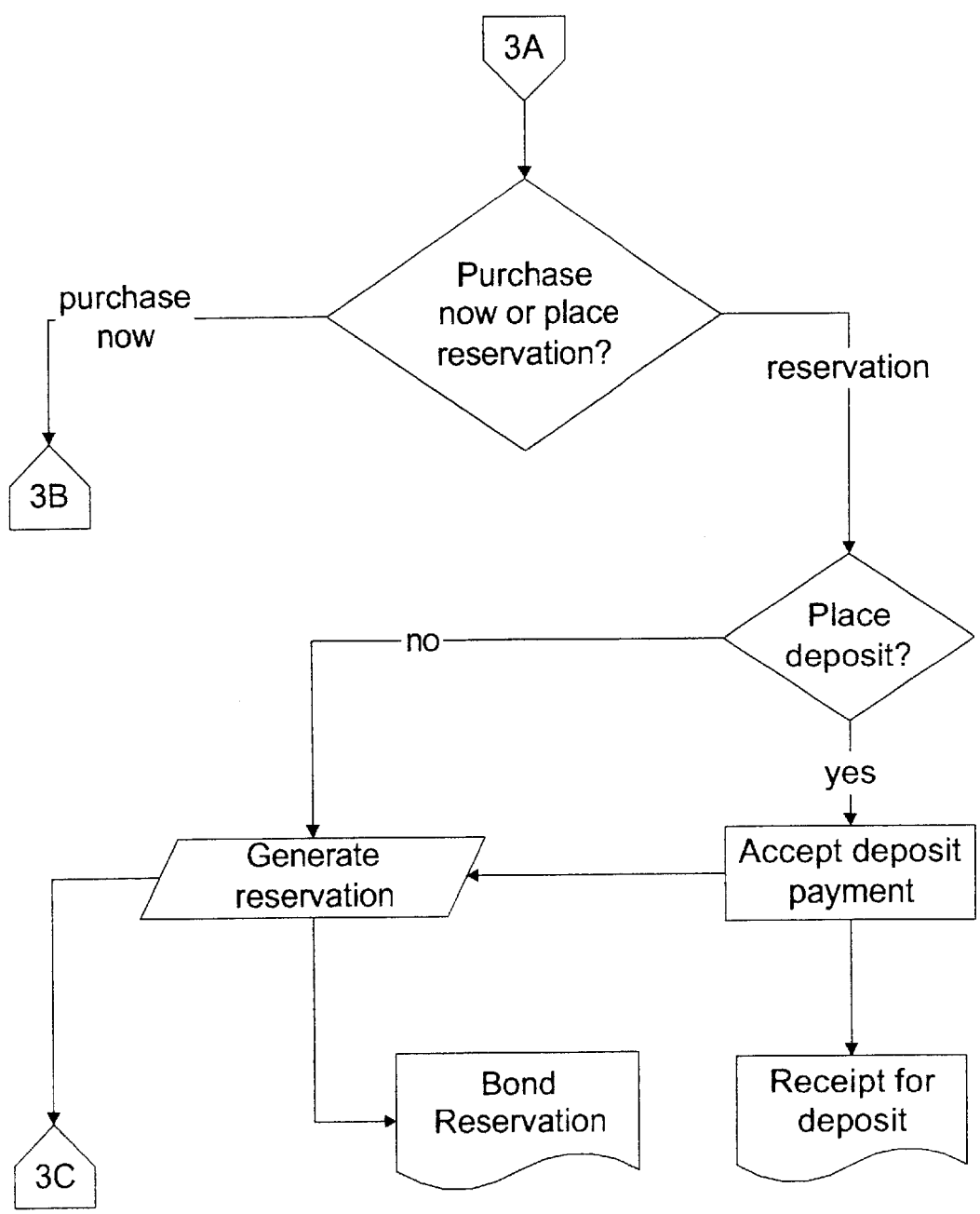

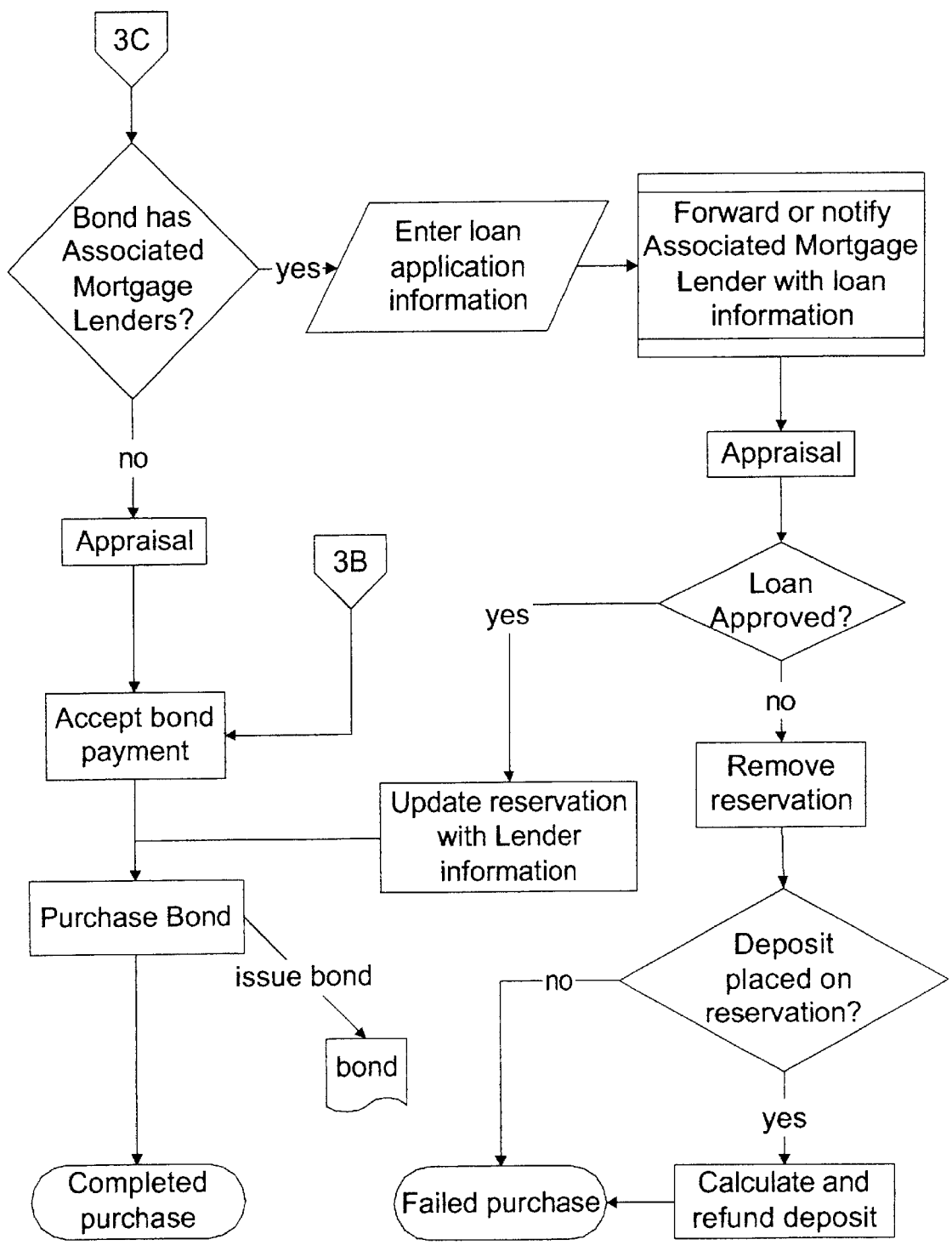
Fig. 3C: Primary Market: Bond Purchase Process

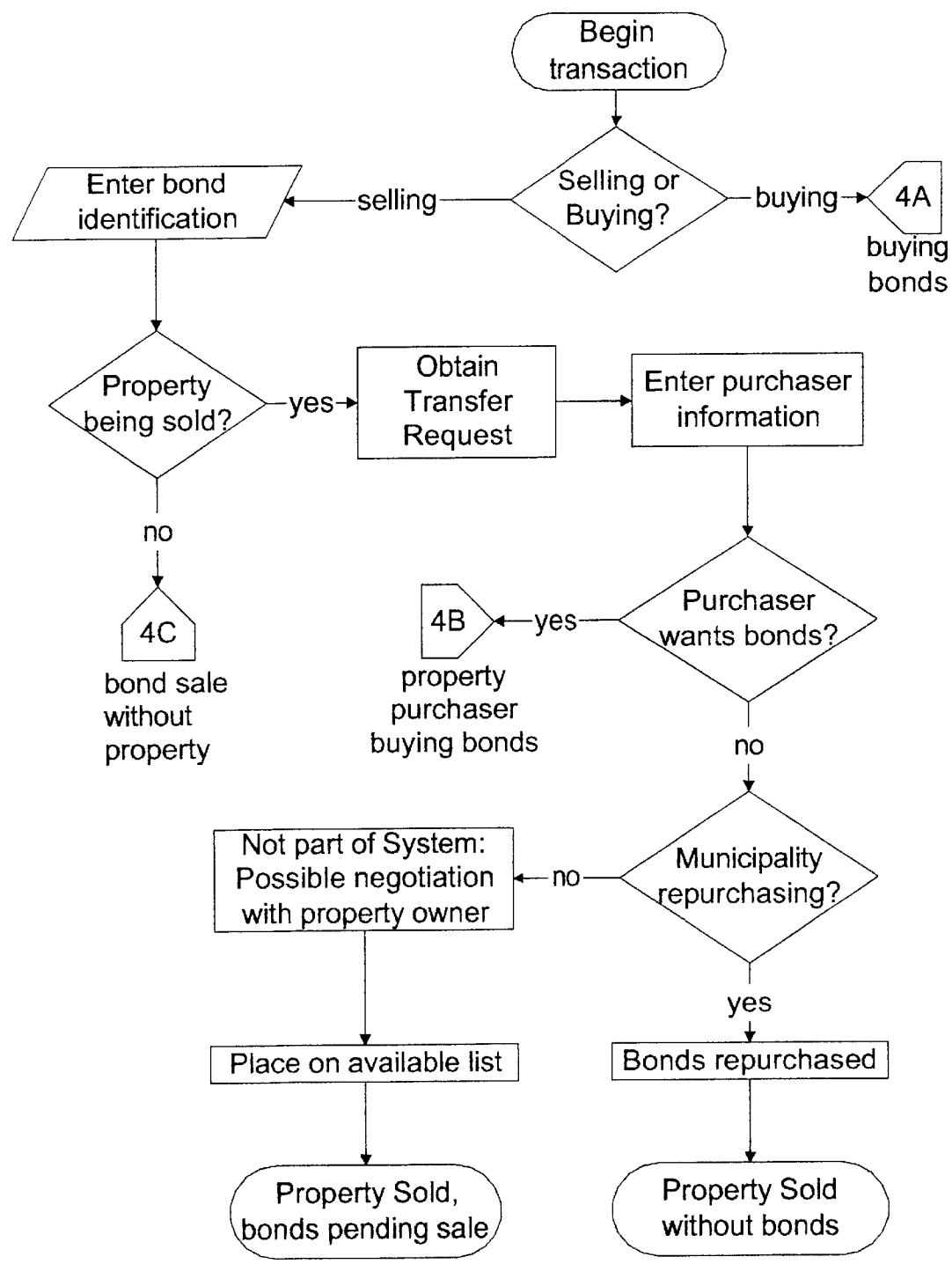
Fig. 4A: Secondary Market: Bond Transactions - Main Chart

Fig. 4B: Secondary Market: Bond Transactions - Buying Bonds
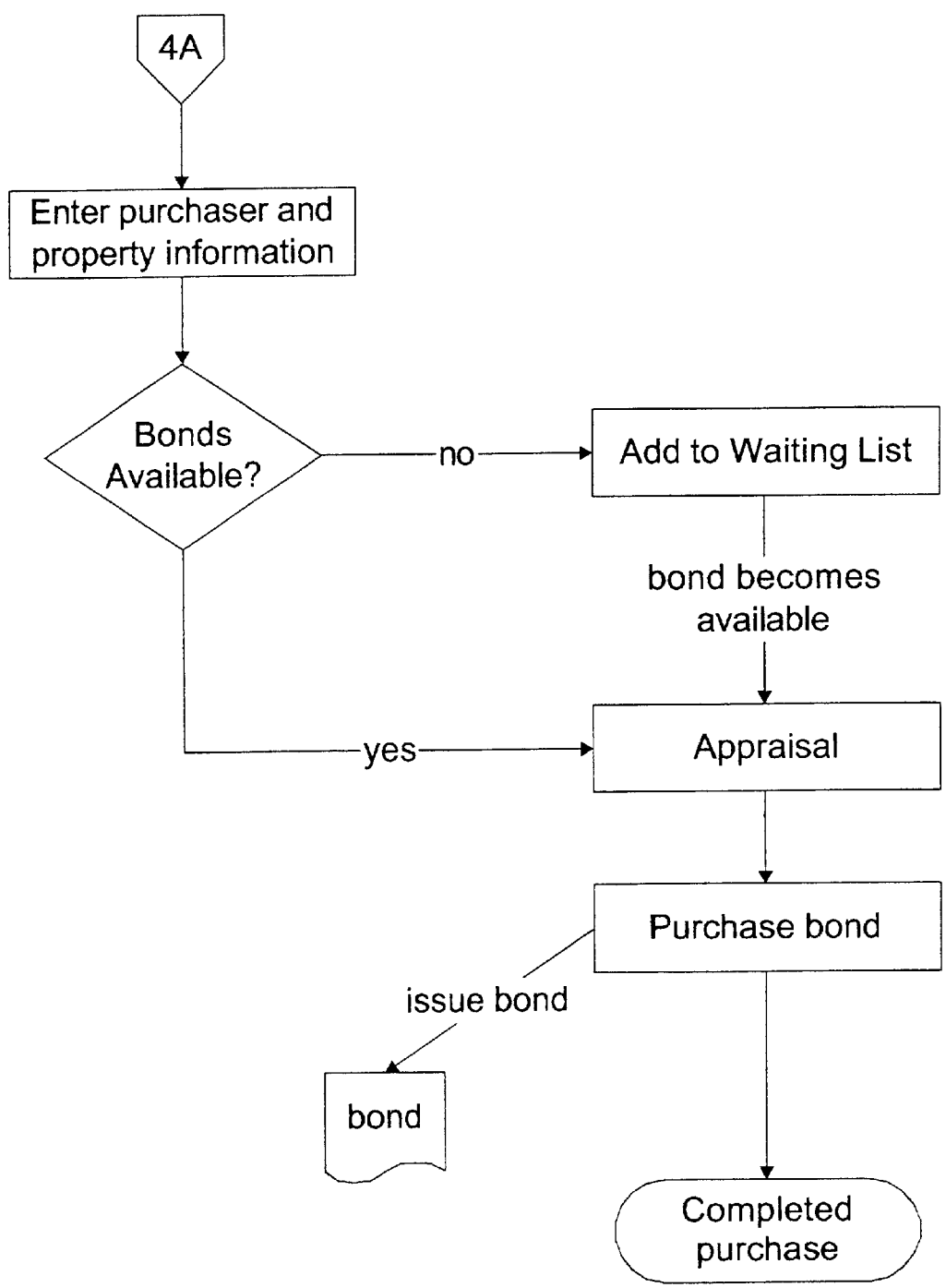

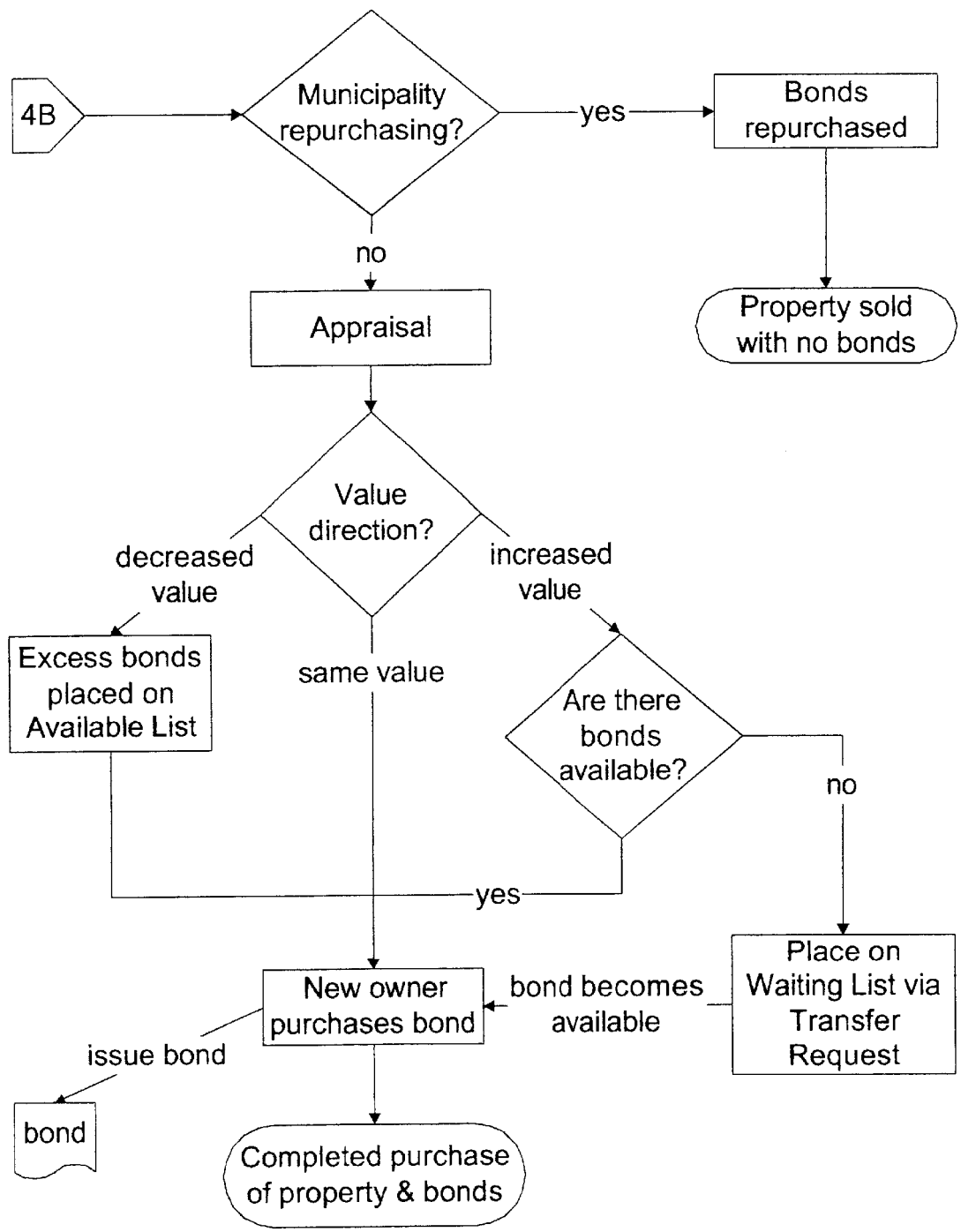

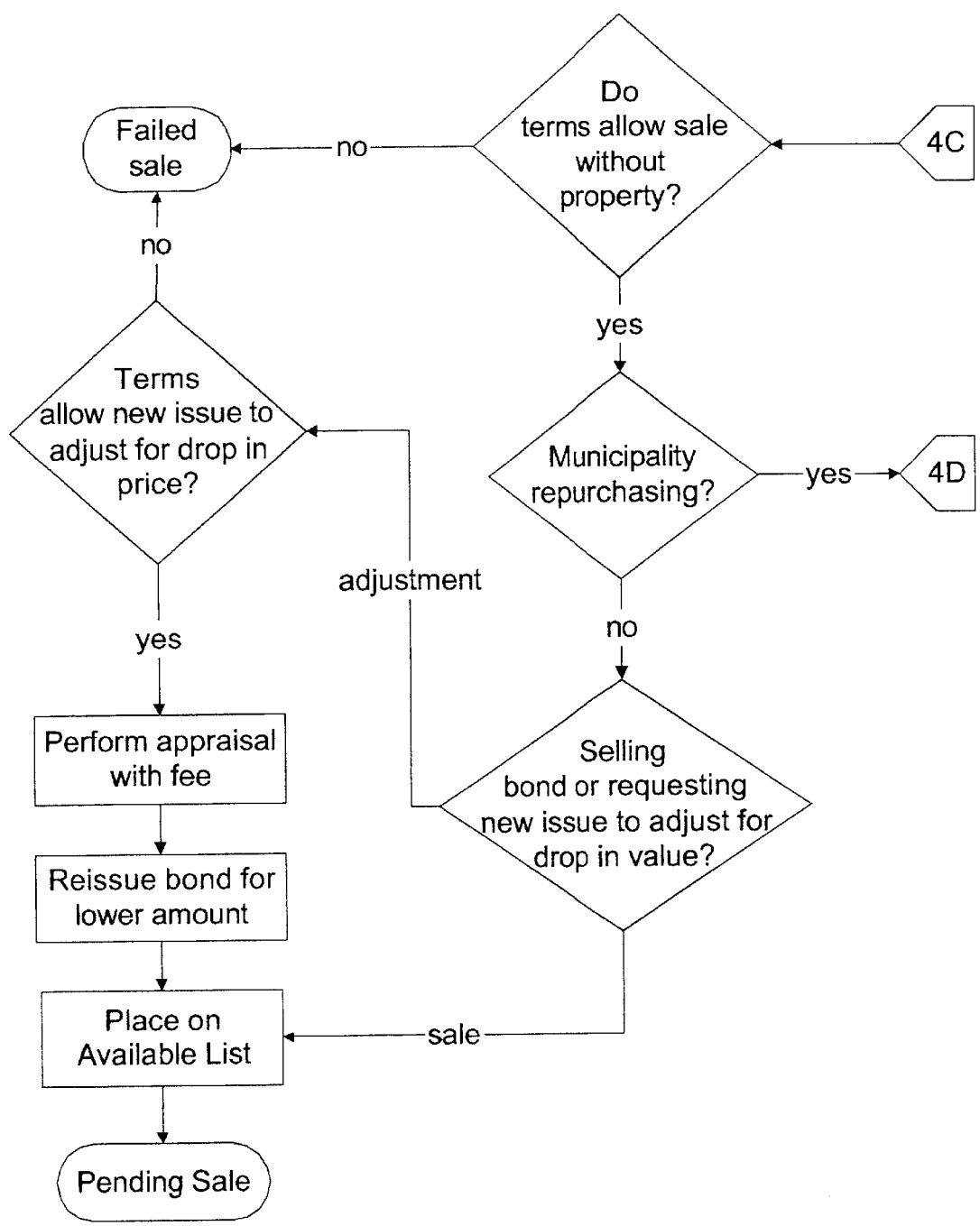
Fig. 4D: Secondary Market: Bond Transactions - Bond Sale Without Property Fig. 4E: Secondary Market: Bond Transactions -
Bond Sale Without Property (cont.)
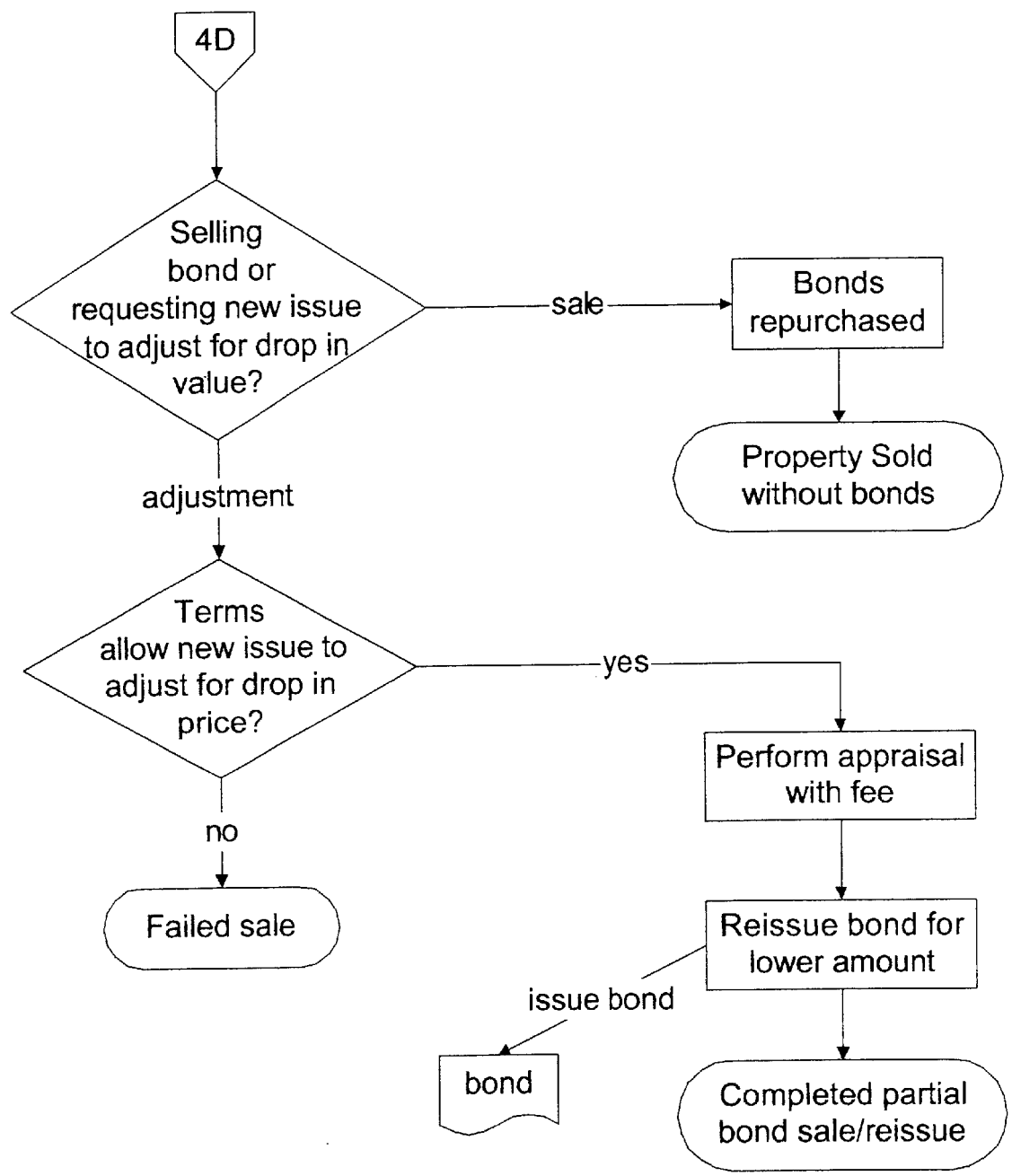

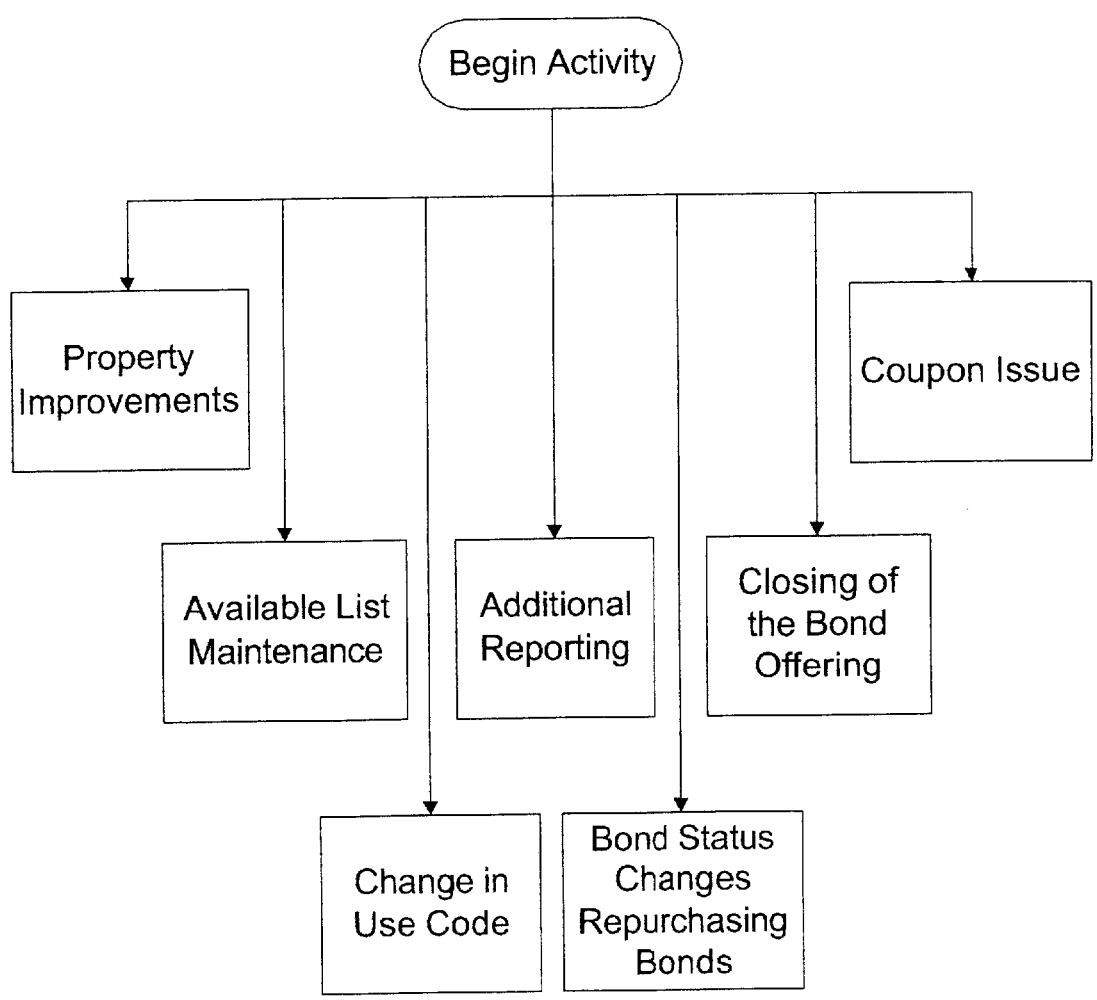
Fig. 5: Miscellaneous Bond and Property Activities

US 6,871,189 B2

MUNICIPAL BOND APPARATUS PRODUCT AND METHOD

This application is a continuation of application Ser. No. 09/304,869 U.S. Pat. No. 6,446,047, filed on May 4, 1999 and claims priority from Provisional Patent Application Ser. No. 60/084,573, filed on May 7, 1998.

TECHNICAL FIELD AND BACKGROUND OF THE INVENTION

This invention relates to a novel municipal bond product, a method of making the bonds available to purchasers using a general purpose computer programmed to perform specific functions, and an apparatus which comprises a specific use computer which carries out the various functions needed to process bond-related transactions. The purpose of the invention is to provide a financial instrument that can be sold to property owners for the purpose of protecting the holder from future ad valorem tax increases, and using computer processing technology to enhance the manner and efficiency with which the products are made available to the public.

Through the repurchasing mechanism, the Bond provides the Municipality with a fine level of control on the outstanding debt of the Bond Issue. This reduces the need and cost to perform conventional bond refinancing through a call and reissuing a new municipal bond for the entire amount.

The Bond reacts in the opposite manner from conventional municipal bonds in regards to inflation and interest rates. Where as a conventional bond's value goes down as these rates go up, a Tax Abatement Bond is worth more. Thus the Bond is an excellent method for diversifying a portfolio.

The instrument will be a municipal bond offered and sold by the ad valorem taxing authority with a coupon designed to service the ad valorem tax at the current levels for as long as the holder owns the house and the bond. Depending upon the local law, it would either contain an express tax abatement provision for the property or a mandatory yield increase matching future inflation in the ad valorem tax rate.

While the following disclosure describes bonds designed for homeowners, the concept is applicable for all real estate that is taxed by a municipal authority. The variations from type of real estate and the changes in wording of a particular bond does not preclude these variances from carrying out the concept or permitting the entire group of bonds to fall within this patent application.

SUMMARY OF THE INVENTION

It is an object of the invention to provide a municipal bond type of investment which will protect property owners from tax increases during the period of ownership.

It is another object of the invention to provide a municipal bond type of investment which will enable municipalities and similar governmental entities to gain access to additional sources of low-cost revenue.

It is another object of the invention to provide a municipal bond type of investment which will provide investment institutions with an additional product which can be marketed at low cost and in large volumes.

It is another object of the invention to provide a municipal bond type of investment which will facilitate proper, legal sale and transfer of the investment.

It is another object of the invention to provide a municipal bond type of investment which will permit both the property owner and the municipality to take full advantage of current Federal and state tax laws.

It is another object of the invention to provide a municipal bond type of investment which may promote civic involvement by property owners in the community.

These and other objects of the present invention are achieved in the preferred embodiments disclosed below by providing a data processing system for creating and administering a bond issue by a bond manager for a municipal taxing authority of a community. The apparatus comprises a database configured to store for retrieval selected information regarding creation and administration of the bond issue, means for storing and processing data representing information needed to determine bond utilization in the community governed by the municipal taxing authority, and means for storing and processing data representing information about a specific real estate purchaser, the real estate to be purchased, the use to which the real estate will be put, and projected purchaser income and income growth to predict whether participation in a primary bond issue would be financially beneficial to the purchaser.

Means are also provided for storing and processing data representing information about the condition of the bond issue to enable the bond manager and the municipal taxing authority to determine the capacity of the municipal taxing authority to repurchase bonds from real estate sellers, for storing and processing data representing taxes serviced by the bond issue, for storing and processing data representing improvements made to the property and whether those improvements require a change in the tax value of the property, and for storing and processing data representing conditions for closing the bond issue.

An embodiment of the method of creating and administering a bond issue by a bond manager for a municipal taxing authority of a community according to the invention comprises the steps of providing a database configured to store for retrieval selected information regarding creation and administration of the bond issue, storing and processing data representing information needed to determine bond utilization in the community governed by the municipal taxing authority, storing and processing data representing information about a specific real estate purchaser, the real estate to be purchased, the use to which the real estate will be put, and projected purchaser income and income growth to predict whether participation in a primary bond issue would be financially beneficial to the purchaser, storing and processing data representing information about the condition of the bond issue to enable the bond manager and the municipal taxing authority to determine the capacity of the municipal taxing authority to repurchase bonds from real estate sellers, storing and processing data representing taxes serviced by the bond issue, storing and processing data representing improvements made to the property and whether those improvements require a change in the tax value of the property, and storing and processing data representing conditions for closing the bond issue.

According to one preferred embodiment of the invention, the step of storing and processing data representing information needed to determine bond utilization in the community governed by the municipal taxing authority comprises the steps of, analyzing support for the bond issue in the community, forecasting the length of time of property ownership, determining terms for issuance of the bonds, projecting municipality growth, expenditures, tax base, population and other indicators such as inflation and unemployment rates, utilizing the data stored and processed to determine estimates of future property values and municipal property taxes; and utilizing the estimates thus obtained to determine an offering price for the bond.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 1A–FIG. 1B is a continuing flow chart of the process of configuring a bond database for a particular municipality;

FIG. 2A–FIG. 2C is a continuing flow chart of the process of creating a particular bond offering;

FIG. 3A–FIG. 3C is a continuing flow chart of the process of selling and purchasing bonds on the primary market;

FIG. 4A–FIG. 4E is a continuing main flow chart of the bond purchase process in the secondary market; and FIG. 5 is a flow chart of miscellaneous bond and property activities.

DESCRIPTION OF THE PREFERRED EMBODIMENT AND BEST MODE

Before specific reference is made to the drawings, further background explanation of the municipal bond creation process is provided.

The marketing approach by which the bond process is implemented is to select various financial institutions who are acceptable to the local taxing authorities. These financial advisors will offer a franchise that would encompass the trademarks, the bond concept, and the marketing approach envisioned for the investment banker. The franchiser will develop the specifics for the following approach to the market place which will include trademarking the terms to be used to designate the type of bond, details related to the specific terms of the bond that make this bond unique and different from all other municipal bonds previously offered in the marketplace, those tax abatement and other tax related issues that will vary depending upon local, state and federal tax laws, and the significant motivation issues that can serve as a desirable approach, by the franchise holder, to the interested parties, be they issuing agencies or purchasers of the bond.

This bond is designed to be sold by a local real estate taxing authority to a homeowner. The conditions that can be selected under which the bond will be sold and bought can vary greatly. The following are some possibilities, but are subject to many variations to take into account specific law and regulations.

Typically, the bonds will be purchased by the new homeowner within 60 days of a home purchase. This provides a window for current owners to purchase bonds from the first bond offering. Thereafter, the bond purchase must be within some predetermined, relatively short time interval, for example, 60 days, of a new or pre-owned home purchase. The value of the bonds necessary for a tax abatement will be based on the current tax rate per hundred, the assessment as previously established for the community by the local taxing authority and a financial "balancing" number determined by the local taxing authority and the investment banker handling the bond issue. This latter number will also reflect current interest rates; those normally paid by the local taxing authority and those normally paid by the local homeowners for home mortgages adjusted for tax savings.

Under ordinary circumstances the bonds will not be transferable. The Bond Manager will handle redemption and issuance. If a homeowner sells his house, he may sell the bonds back to the issuing authority. If a homeowner determines that he wants to sell the bonds, he may sell the bonds back to the issuing authority at any time for any reason with a predetermined waiting period and price. The face value of the bonds will be the redemption price. The bond is specific to a specific piece of property.

There will be a cost to selling and buying the bonds as determined by the Local Issuing Authority ("LIA") and the investment-banking firm.

The size of the initial bond offering will be determined by the need of the LIA to raise funds and the prospects as forecasted by the market research undertaken at the time of announcement. Thereafter, it would be expected that future bond offerings would be undertaken as deemed necessary and advisable.

All homeowner real estate taxes must be paid up to the date of the bond purchase, and at the time of the bond purchase.

If a house is sold, but the homeowner does not properly offer the bonds back to the LIA, there is no penalty for the homeowner, but he/she is effectively losing any interest he/she might have obtained had he/she cashed the bonds and invested the proceeds.

The face value of the bonds may be $1,000 or any other desired value. The amount of bonds necessary to relieve a homeowner of any real estate tax obligation will be that amount as calculated by the LIA rounded to the nearest thousand dollars.

The above principles are set out in the following example:

EXAMPLE 1

A prospective homeowner wants to purchase a house for $150,000. The property tax is $12.60 per hundred based on an assessment of 10% of real value, or $1890.

If the current interest on a municipal bond was 7% interest, the homeowner would have to purchase $27,000 worth of bonds.

Prior to the bonds being offered, the LIA, with the Franchisee, would determine whether or not the bond should bear a variable coupon that would make the coupon equal to the ad valorem tax on the house, and be a non taxable item for the payers of federal income taxes.

Further, a determination must be made for the wording of the bond so that should the homeowner take out a loan to purchase the bonds, the interest on the loan is a deductible interest payment for that homeowner.

As stated above, $27,000 in bonds at 7% equals a $1890 real estate tax bill. The deduction value of interest cost of a $27,000 bank loan, based on an interest rate of 8%, would be $2160. Most differences between the net cost of a bank loan to purchase the bonds and the coupon value of the bonds would be offset by the net tax effect of the deduction against federal taxes.

Advantages to Homeowner

If the homeowner considered the relative merits of investing in stocks, he could possibly consider the opportunity of achieving a higher return, particularly in the economic climate of the past several years. But, for the typical middle class homeowner, a balanced portfolio is usually a goal, and the typical investment contemplated by the investment program is modest in relation to the total investment portfolio of many individuals.

This new bond will meet a need heretofore not met by previously issued municipal bonds. The bonds provide for the security and peace of mind of knowing taxes will not go up as the value of this particular house increases. The taxpayer has assumed control over the tax cost of living in his home. This is particularly significant to retired persons, or those living on fixed incomes who cannot afford substantial increases in taxes resulting from inflation, supply and demand in the local economy or other factors.

This financial instrument has potential appeal to individuals in a wide range of circumstances. Thus, the cost of raising funds by municipalities will significantly decrease. The cost to the taxpayer of owning this bond will be reduced due to the ability to turn the bond back to the issuing agency at any time convenient to the holder. The cost of maintaining these instruments in the market place will be significantly less for the municipality and its tax payers than previously issued municipal bonds.

Public Benefits

In addition, the bonds will have a public benefit in that it will facilitate the efforts of the SEC to regulate the excess trading margins by brokers trading in municipal bonds. The ability of the homeowner to invest in his own community could have a very positive impact on voter participation and involvement by the voters in the communities financial affairs. The bond builds a more stable tax base. Community members will invest in other ways due to the long term commitment to the area. This community oversight can only help keep governmental officials honest, above board and efficient. The ability to obtain this form of insurance against real estate tax increases can also provide an attraction for potential residents looking at a particular community as a possible home.

Governmental Benefits

The invention also addresses the needs of most governments for additional funds at reasonable cost and at minimum risk. Bond interest rates are often increased to compete with other similar instruments being offered at the same time. However, the bond according to the invention may permit sales at a lower interest rate because of the other desirable features of the bond. There is a highly publicized need for increased educational spending and for repairing the infrastructure of most cities and states, such as highways, bridges, other transportation needs. The initial communities that adopt a bond program according to this invention will probably find that the desirability of their tax program will be such that an influx of new homeowners will increase their tax base.

Since governments work with "Profit and Loss Statements" and the value of assets owned by a community gets little consideration, bond issues often face an uphill battle at the ballot box.

It is anticipated that the bonds should have a higher rating than regular bonds requiring tax revenues for payment of principal and interest as well as the possibility of lower interest costs than for regular bonds. Normally, a fast growing community needs large sums of funds to make capital investments in the infrastructure and would have to offer more interest than fully-established communities with a large diversified tax base.

Stable communities are experiencing higher than historically normal increases in housing costs, despite the low increase in inflation. The bonds described in this application will permit a more stable bond market with a minimum of transactions. In short, the bonds according to this application have no downside other than the opportunity of cost of foregoing a potentially higher yielding alternative investment, which is always a consideration no matter what the type of investment.

The financial institution with a strong presence in Municipal Bonds has varied issues. It must evaluate the issuing authority's financial position, forecast the possible changes in that condition, consider the rating the bonds will most likely receive before pricing the issue and determining the size of the issue. A bond in accordance with this invention will have many of these same issues, but to a lesser degree. The market for the bonds will be more stable, and while the investment banker will not have the same rate of churning for this category of bonds, he will have to handle the transfers of ownership. This category of bond will probably be sold to many people who have never purchased a municipal bond in the past. In many respects the present municipal bond market is similar to the mutual fund market of twenty years ago—large but concentrated in a relatively few institutions and thus beyond the reach of most individuals.

A franchised financial institution will have manuals available to them to expedite the process from no knowledge of this type of financial instrument to being able to disseminate full information throughout their staff and bring them up to speed very quickly. These manuals will address the following considerations:

1. Legally-required product description along the lines of currently required prospectuses furnished to investors before purchase;
2. Training Manuals for Branch Managers
3. Training Manual for Supervisory Personnel
4. Property Owner Question and Answer Booklet
5. Telemarketing Manual Computer programs will be developed to facilitate summarizing questions and answers, to detail choices on Bond Terms and Conditions, to control telemarketing functions and to process orders, sales, transfers and the like. These processes are illustrated in the accompanying drawings FIGS. 1A–5.

Many taxpayers own their own home. Many believe they will want to continue to live in their current home after retirement. Many are concerned that they will be forced to sell their home as their taxes increase to a level above that their retirement income can support. This emotional motivation will emphasize the economic benefit of the bonds.

If, as has happened in many locations, the appraised value of residences has tripled in value over the past 15 years, the taxes have also increased by a factor of at least 3. This increase is generally considerably greater that the increase in pensions, social security and other "fixed" transfer payments, which are pegged to a much broader index such as the consumer price index.

The bond as described in this application will provide to the homeowner a fixed "tax" cost on his house, interest deductions on loans to purchase the bonds from the taxpayer's income taxes, and thus the assurance that the increase in taxes will not require a sale of the property.

Application to Commercial Property Owners

The commercial property owner will have similar advantages. The purchase of these bonds on his property will permit any property owner to forecast accurately the tax cost of ownership into the future, obtain a fixed loan mortgage from his financial resources, including taxes; fix the cost of space to tenants including taxes. At the current time, most leases have a tax and COL clause that can double the cost of rental space of a short period of time.

Landlords will be able to offer an opportunity for increased control over space costs for a competitive advantage where these bonds are offered.

The typical LIA reevaluates its tax values every 5 to 10 years. The typical home buyer lives in the same house or apartment for less than 5 years. But, in some retirement communities the typical home buyer lives in the same house for a considerable length of time, passing through one or two reevaluations, cutting the tax revenue of the community by a significant amount, if all other factors remain the same. But, the community in many areas adjust the reevaluation rate as they leave out of the calculation those homes that are covered by the bonds. Thus, the tax rate might increase to a level higher than it would have otherwise, so the total income remains the same for the community.

Computer Modeling and Transaction Management

Computer models will be developed for each community in order to permit the effect on the community's long-term income to be forecast.

Computer software will also be programmed to evaluate the information received during the announcement and sale period of the communities' consideration period so that the community can more accurately determine the size of the initial bond offering.

A suitably-programmed general purpose computer is envisioned as the most cost-effective manner of implementing the invention.

Municipality Configuration Process

Each Municipality has its own defined process for creating and offering a bond. As is shown in FIGS. 1A–1B, the system allows for the defining and configuration of a customized process. The system will add a Step in the process. Each Step names the Position such as Financial Advisor or group such as City Attorney's office. It also defines the documentation and attributes that must be included at each step. For instance, the written recommendation of the Municipality's Financial Advisor or the Bond Hearing minutes from the City Attorney's office might be included. The names of the members of a Bond Council might be included in its approval Step. These defined Steps are stored in the Bond Database and are used as meta data to define and control the process of creating an actual bond offering, which is defined in the next section.

There are additional processes and organizational definitions that the System stores in this initial phase. Examples are the defining of the organizational departments that handle property improvements (usually a zoning board) and department of revenue which may be responsible for property appraisals, property ownership changes, and tax collection. These definitions will be used to link the Bond Manager with appropriate municipal entities in the maintenance of the Tax Abatement Bond.

The System allows entry of the different owner types, zone categories, and use codes that can be specified for an owner or the property.

The System allows entry of the different tax rates associated with zone categories and/or use codes. The System also allows the specification of what items are tax deductible. For example, if a loan is taken out to purchase the bond, is the interest tax deductible? Is the amount that the property owner would have paid in taxes, tax deductible? These parameters are used to provide comparisons between conventional municipal bonds and this Bond.

The System allows the entry of default Federal, State and Local tax rates for different owner types, property value categories, and use codes. This allows the System to provide comparisons between conventional municipal bonds and this Bond.

The System allows entry of default rules and bond pricing based on the configured owner types. Note this can be overridden in the configuration of a specific Bond as described in the next section.

The System provides access to a database that contains property records within the municipality. This database includes at a minimum property parcel identification, ownership, address, value, property taxes, zoning, last purchase date. The System is configured to either access or import this information.

The System using a variety of criteria such as Zone Category, Property Value Categories, School District, Voting District, Zip Code, Tax Abatement Bond Issue Identification for reporting. These are limited only by the available data. The System can be configured to make available any of these criteria within the Graphical User Interface (GUI) for reporting. This System records which numeric fields can be summed such as Property Value, and Property Tax Value for reporting purposes.

The System provides online and printed reports. In several cases, in particular the reports utilized to perform Bond support in the community, can be customized. Their specific settings can be named and saved as templates. These can be accessed from a menu of available reports in the Bond creation process. Wizards are used to help the user create the most commonly needed report templates.

The System maintains records of any other Tax Abatement Bonds already applied to a property.

Creating a Bond Offering

Referring now to FIGS. 2A–2C, the manner of creating a bond offering is explained. A Bond is entered into the database. The database will contain its name, a description of its purpose, a proposed amount and term, its proposed sources of revenue, and other relevant data.

The System estimates and reports on potential levels of funds generated by the database of properties that represent the municipalities tax base. This step is used to evaluate the efficiency of utilizing a Tax Abatement Bond over a more conventional bond instrument.

For each defined Step (see System Configuration in FIGS. 1A–1B) in creating the Bond, data and documents are stored in the Bond database.

The System can be configured to use either an Internal Bond Manager or an External Bond Manager. An Internal Bond Manager is used when the municipality has chosen to manage the Bond itself. An External Bond Manager is used when the municipality has negotiated with a third party to manage the Bond. The Bond management configuration is then stored in the database. The System will refer to the above as the Bond Manager in this document.

The Municipality and/or the Bond Manager performs several processes utilizing the System. The System provides a set of tools to analyze the performance and behavior of the Bond based on a wide variety of criteria. The process of defining the Bond is iterative. The following steps as set out in FIGS. 2A–2C will be repeated until the Bond is defined.

Analyze Bond Support. The System analyzes the Bond support in community. This will be looking at the bond referendum, public and business commentary, studies of business and residential properties and their associated values. The System provides the ability to display or print reports and charts to analyze the tax base. The System uses the configured criteria to define a subset of the properties to be examined and/or display percentage breakdowns of those properties. Any numeric field within the Bond database can be summed or manipulated. For example, the report facility displays the total property value, tax value in dollars, and number of properties within the above categories. The number of properties and dollar amount per property is used to provide averages and distributions per category. The System utilizes the Bond value and price for each purchaser category to calculate the potential Bond dollar yield per category. The Bond value and price for each purchase category can be adjusted to perform what-if scenarios on the resultant Bond Yield.

Forecast length of Property Ownership. The System attempts to forecast the average length of time a property owner will hold the Bond. This is done utilizing information such as the municipality's property records showing last purchase date and changes in ownership. This is broken down by owner type, zone category, property price category, use codes. It in turn is augmented with a rule based system that utilizes other historical data and projected economic forecasts.

Write terms for Bond Issue. This is a large legal document which the System will store a copy of in the Bond database. However the terms of the Bond Issue also dictate certain behaviors such as when a bond may be refunded, whether a new bond can be reissued to a new property owner, whether appraisals are required, what improvements can be made to a property, the percentage of property value permitted through improvements with no additional purchase of bonds, what fees are involved, and how much the fees are. The System stores these items in the Bond database and are used to control related behavior and calculations.

Project growth rates. The System allows the entry of projected municipality growth rates such as expenditures and tax base, population, as well as other indicators such as inflation and unemployment rates. These are utilized by the System to project future property values and taxes. These can also be stored as named configurations, specific to the Bond issue, or the System, to perform what-if scenarios.

Price the Bond. The System allows overriding the default rules and bond pricing based on the configured zone category, use code, property value category, and owner types. This would apply only to this Bond Issue. Several pricing configurations can be stored for what-if scenarios. The System also displays comparisons between a conventional municipal bond utilizing the configured rules, and bond pricing. Using the System specify the pricing of bonds using the, and owner type of the bond. An owner type can either be residential individual, sole proprietor, or corporation. The property use code may be residential, commercial, industrial, office, or any category set by the municipality for property within the municipality. The System makes recommendations which can be overridden. This is required since a conventional municipal bond's interest rate is effected by Municipality's Bond rating as well as other factors such as availability of other bond issues. The pricing for the Bond Issue is stored in the Bond database and utilized during the purchase process. The pricing varies based on ownertype, due to the projected length of ownership of a property. Since corporation can potentially 'live' forever, the System recommends a much higher price ratio for their Bond price. In addition, the terms of the Bond Issue may be written to protect the community from a total loss of future revenue with additional guidelines. For instance, the corporation buys "x" dollar bonds based on the formula. After a pre-designated number of years, say 10 years, if "x" dollar bonds are still outstanding, the municipality reappraises the property. That becomes the base number for the value of the property. If at some time in the future, the property is sold for a higher number, the issuer gets a percentage of the difference between the sales price and the appraised value. This System can be customized to track and implement this process.

Constrain Bonds by Category. The System lets the municipality limit the number and value of bonds sold for a specific category such as owner type or use code. This allows the municipality to ensure a diverse holding of any particular Bond Offering. These constraints are stored in the Bond database.

Project Bond Cost. The System projects eventual cost of Bond Issue to Municipality. This utilizes the economic data specified in previous steps. It also allows specifying a rate of bond repurchase starting in a given year, or a year by year specification of repurchased bond dollars.

Bond Mortgages. The System can register and record relationships with mortgage lenders and handle special interest rates for the Bond offering. These lenders will lend the funds necessary to purchase the bond, using it as collateral. These lenders will later be referred to as Associated Mortgage Lenders.

Publish Terms. Disseminates rules and publish offering. This can be done through a variety of methods including the Internet.

Setup Accounts. The System can be configured to support any necessary financial accounts between Municipality and the Bond Manager. These may include an account in which money is deposited for Bonds sold and possibly one for moneys designated to redeem bonds from their holders. The rules governing these accounts would be negotiated and set by the Municipality.

Merge Old Bonds. Merge Tax Abatement Bonds records pending Bond Issue closure (from a previous Bond Issue) into this Bond Issue. This process generates letters to the Property Owner, Tax Payer, and Bond mortgage lender indicating the merger into the new Bond Issue, and specifies any new contact information or term changes.

Primary Bond Market

The process of purchasing a bond in the Primary Market is shown in FIGS. 3A–3C.

Enter purchaser and property information. The purchaser enters information about themselves, the property for which the Bond is to be purchased, and how it is to be used into the System. This includes such information as their name, owner type, the property address or parcel identification, and its use which will map to a use code.

Purchaser evaluates Bond. The System can generate a report showing how the Bond can benefit a specific purchaser. This requires that the purchaser enter additional information about themselves such as their current and projected income, how they plan to purchase or finance the Bond. An estimate of the potential savings can be generated with a description of the assumptions and appropriate disclaimers.

Are there available bonds? There are a limited number of dollars of bonds available. If too many bonds have been purchased or reserved, then the purchaser is so informed. The number and/or dollars of bonds issued can also be limited by owner type or other criteria.

Record request overflow. If the limit has been exceeded, then the purchaser and his property are recorded anyway and a reference is created to them in an overflow log entry.

Notify purchaser and offer waiting list. The purchaser is notified of the lack of available bonds and is given the opportunity to be place a reservation without a deposit.

Notify Bond Manager. The System can be configured to send a notification that there are no more bonds available or available within a category. The System allows the Bond Manager to display and/or print reports showing all purchasers that have overflowed.

Reservations

Purchase now or place reservation? The System supports a variety of methods for managing and tracking initial bond sales. When a bond is offered there may be extreme demand. This may require a quick response through either an immediate purchase or making a reservation to purchase the Bond. A Property Owner may have to go through a loan approval process to secure the entire amount necessary to purchase the bonds to cover the value of the property. This could delay the purchase to the point that the Bond was no longer available. The System can either accept an immediate purchase or take a reservation.

Place Deposit? The System can support reservations with a deposit.

Accept deposit payment. The System will record the payment type and amount and issue a receipt to the perspective bond purchaser. The deposit amount is calculated as per the terms of the Bond Issue. The deposit may be refundable in the event that the loan is not granted. The System will track bond purchase reservations and allow the Bond Manager's Account Executives to monitor a purchase. The System provides interactive and reporting of unfilled reservations by Property Owner, reservation date, property owner type, and bond amount. The System also provides summary information on the dollar value of the bonds thus far reserved, reserved with deposits, and those purchased. The System, if so configured, also checks to see whether any reservations without deposits have now been displaced. If so the purchaser can be notified, indicating that they may still be able to purchase the bond.

No Deposit. The System allows a Property Owner to place a reservation without a deposit. The terms of the Bond Issue dictate the priority of purchase. For instance, reservations without a deposit might be superseded by those with a deposit or anyone immediately purchasing the bond.

Generate Reservation. A reservation is stored in the Bond database with references to the purchaser and property information.

Accept bond payment. The purchaser supplies an acceptable form of payment.

Purchase Bond. The actual purchasing of the bond requires additional information to be provided by the Property Owner. The System will record information such as Social Security or Federal Tax I.D. Number, mailing address, phone numbers, fax numbers, e-mail addresses.

Appraisal. The terms of the Bond Offering may require the municipality to perform an appraisal which will be utilized to update the property value prior to the bond price being set for the property. If this is the case the System will generate a notification to the municipality's entity responsible for appraising property and store a state code indicating that an a appraisal is pending. Otherwise the current value of the property and the associated property taxes will be used to calculate the cost of the bond.

Bond Financing

Bond has Associated Mortgage Lenders? Some property owners may desire to finance the bond, especially if there is additional tax incentive. Associated Mortgage Lenders may be selected during the bond reservation process.

Enter load application information. This requires that the Property Owner specify additional credit information. The System will record this information and the specified lender.

Forward or notify Associated Mortgage Lender with loan information. It may either forward pertinent information to the lender for automated processing or generate a notification based on the capabilities of the lender's own systems.

Loan Approved? The System is notified of the result of the bond loan application. This step can consist of the processing of several loan applications.

Update reservation with Lender information. If the Property Owner utilized a loan to purchase the Bond, this information is entered into the System specifying the mortgage Bond lender.

Remove reservation. The System removes the reservation from the System.

Deposit placed on reservation? Yes, if a deposit was included with the reservation.

Calculate and refund deposit. The terms of the Bond Issue dictate whether the full amount of the deposit is refunded or a fee is charged for the reservation or loan application. This fee may be a fixed amount or a calculation based on the property for which the bond is being purchased.

Bond purchase. The System then stores the bond information in the database showing the bond issue identification, the property parcel identification and the Social Security Number or Federal Tax I.D. of the purchaser, the bond purchase date, bond price, property value, and initial property taxes. The System then records the funds deposited in municipality account. The bond is then issued. In the case of a loan being used to purchase the bond, the terms of the Bond Issue and the bond mortgage lender may allow the bond to be retained by the property owner, however the System will record a restriction preventing the owner from selling the bond. Otherwise the Property Owner is issued the bond.

If there is a mortgage on the property and the mortgage lender pays the taxes, then the mortgage lender information is entered into the System replacing the Property Owner as the Tax Payer. Otherwise, the Property Owner is listed as the Tax Payer. Note that the mortgage for a new home or purchase can include both the property and the bond, in which case both lenders would be the same.

Secondary Bond Market

Referring now to FIGS. 4A, 4B, 4C, 4D and 4E the Secondary Bond Market deals with the bonds that have already sold, the Bonds on the Available List, and those Property Owners on the Waiting List.

The System supports the current bond holder in selling their bond. It provides the seller the ability to reserve a place in the Waiting List so the new property owner can purchase new bonds in the event that the terms of the Bond Issue require it, and the property value has increased. The System provides the means of initiating municipal appraisals to expedite the bond sale. The System supports the Property Owner in selling the bond if the new Property Owner does not want the bond, by providing a central clearing house for the Bond. The Property potentially has added value because it has a Bond associated with it. The Municipality is benefitted by stimulated awareness of the Bond, because each Property Owner with bonds becomes a partner is selling the Bond.

The Available List is a list of bonds that are available for purchase. The bonds in the List fall into three categories:

bonds that are associated with properties and property owners, repurchased bonds (this may occur depending on the terms of the Bond Issue), or bond dollars carried over from the Primary Bond Market. The bonds associated with properties and owners still issue the Tax Abatement Coupon for the associated property. Repurchased bonds retain information such as when they were added to the list, what the repurchase date was, Owner Type, Zone Category, and Use Code. The order in which items are removed are dictated by the terms of the Bond Issue and configured into the System. For example the terms may dictate that the bonds carried over from the Primary Bond Market must be sold first, then those repurchased and finally those still associated with a property are sold. Within each category the bonds would be sold in a first-in-first-out order. The System can make estimations and display them as to when a specific bond will be repurchased based on property purchasing patterns and levels, the contents of the List, current List position, and the Municipality repurchasing state.

The Waiting List is a list of Property Owners who want to purchase a bond. Property Owner can mean a current owner of a property within the municipality, or purchaser of property. The Waiting List also stores the Property that the bond is to be associated with, the current appraised value, and possibly associated document data such as a Transfer Request. The Waiting List can have several categories of ordering based on associated document data. For instance, any Transfer Request Property Owner might be given a higher priority than a Property Owner. Within each category the Property Owners would be serviced in a first-in-first-out order. The System can make estimations and display them as to when a number of bonds will be available based on property purchasing patterns and levels, the contents of the List, current List position, and the Municipality repurchasing state.

These principles are explained in FIGS. 4A, 4B, 4C, 4D and 4E:

Municipality repurchasing? This is first determined by the terms of the Bond Issue, and then within those terms by the desire and capability of the municipality to repurchase the Bond. This secondary decision making process is dictated by the procedure set up between the Bond Manager and the Municipality. The System can be configured to make the decision based on a Bond status, the availability of funds within an account, or some as yet undetermined method.

Bonds repurchased. The bonds in question are repurchased by the Municipality. They are not placed on the Available List. The Bond database is updated with the sum repurchased. The System supports the capability, if the terms of the Bond Issue indicate, a partial payment to be made to the bond holder for the time the bond was held since the last coupon was issued. This payment may either be a cash refund or a tax abatement coupon. The principal of the bond is repaid to the Property Owner or to the bond mortgage lender if there is one. The bond within the Bond database is updated with its new status.

Appraisal. The System notifies the Municipality of the need to perform an Appraisal utilizing the defined entity. The Appraisal is performed. The results of the Appraisal are stored in the Bond database by the System. The terms of the Bond Issue may require that a fee be paid. The System will accept and record the payment of the fee and issue a receipt.

Referring now to FIG. 4A:

Selling or Buying? Transactions are first broken down by whether a bond is first being sold. The same bond is never actually resold. A new bond is reissued to the new owner. If there is no bond, then we are dealing with a buying operation.

Enter bond Identification. Each bond is issued a unique Bond Identification. This is entered into the System and the System retrieves the bond and its associated information.

Property being Sold? The terms of the Bond Issue may allow a Property Owner to sell the associated bond without selling the property.

Obtain Transfer Request. The Property Owner may offer the option to buy the bond as part of the sale of the property to the new owner. The Property Owner obtains a Transfer Request from the Bond Manager using the System. The terms of the Bond Issue dictate whether there is a time limit and its duration for the Transfer Request. The terms also indicate whether there is a fee for the Transfer Request, whether it is renewable (if the time limit expires) and whether a portion or all of the fee is refundable if either the bond is repurchased by the Municipality or no transfer takes place. The System stores the Transfer Request in the Bond database. The information stored includes the associated bonds, property owner, and property, and any fees paid. The terms of the Bond Issue will dictate whether the property will be appraised at its current value. It may require the purchasing of additional bonds to cover the property taxes. The System will also record any desire to purchase additional bonds to cover increased property value and place an entry in the Waiting List to purchase the bonds.

Enter purchaser information. The information about the purchaser and how they intend to use the property is entered into the System. This includes such information as their name, owner type, and its use which will map to a use code. This information is needed even if the purchaser does not buy the associated property bonds. If the new owner is not of the same Owner Type as the current owner, or is used in a different fashion (a different Use Code), then the terms of the Bond Issue may indicate that no coupon or a reduced coupon will be issued.

Purchaser wants bonds? Yes, if the purchaser wants to buy the bonds along with the property. It may be that the new owner does not wish to purchase the bonds associated with the property. The terms of the Bond Issue dictate whether a refund must be issued. Different terms may exist based on the date of the initial Bond offering. These will specify when the bonds will be refunded from the property sale date.

Not part of System: Possible negotiation with property owner. The terms of the Bond Issue dictate whether the property taxes will be adjusted at the time of sale or when the bonds are finally transferred or refunded. Any compensation to the original owner for the monetary gain of the associated Bond tax abatement is defined by the purchase contract between the old and new property owners and not the terms of the Bond Issue, the municipality, or the Bond Manager. It therefore has no impact on the System.

Place on Available List. The bonds are placed on the Available List. A transfer of property ownership is entered into the System. The bonds are still registered as owned by the original property owner. The new property owner will gain the benefit of the bonds' coupons until the bonds are purchased by another property owner and transferred, or when the bonds are refunded by the Municipality as dictated by the terms of the Bond Issue.

Referring now to FIG. 4B, the secondary bond transaction market is explained further, and covers situations where a property owner may not have been able to purchase bonds in the initial primary market due to demand, or did not take advantage of the initial offering.

Enter purchaser and property information. The purchaser enters information through the System about themselves, the property for which the Bond is to be purchased, and how it is to be used. This includes such information as property owner's name, owner type, the property address or parcel identification, and its use which will map to a use code.

Bonds Available? Yes, if there are sufficient bonds on the Available List, otherwise No. If 'Yes,' then the necessary number of bonds are removed from the Available List to be sold. If, when the bonds are removed from the Available List, they are still associated with a Property Owner, then the Property Owner is refunded the bond amount, and the bond status changed.

Add to Waiting List. The System stores the purchaser and property information in an entry in the Waiting List.

Purchase bond. The actual purchasing of the bond requires additional information to be provided by the Property Owner. The System will record information such as Social Security or Federal Tax I.D. Number, mailing address, phone numbers, fax numbers, e-mail addresses.

FIG. 4C describes the secondary bond transaction market where a property purchaser is buying bonds.

Value direction? This compares the appraised value with that of the value originally covered by the bond. If the value has not changed, then the decision is 'same value'. If the appraised value has gone down, it is 'decreased value', and if it has gone up, then it is 'increased value'.

Excess bonds placed on Available List. In this case the value of the house has gone down. The difference in the new value is the value of the bonds placed on the Available List. The terms of the Bond Issue dictate whether the value of the bonds are refunded to the current owner or whether they must wait until they are repurchased.

Are there bonds available? Yes, if there are sufficient bonds in the Available List. The available bonds are removed from the list.

Place on Waiting List via Transfer Request. The System stores the purchaser, property information, desired dollars in bonds, and a reference to the Transfer request in an entry in the Waiting List. This type of entry is usually configured to have a higher priority.

New owner purchases bond. Upon sale of the property, there will be an associated transfer fee that will include a fee for the bond. This fee is dictated by the terms of the Bond Issue. The System calculates that fee, accepts payment, records payment, and issues a receipt. Upon sale of the property, the System records a transfer of ownership of the property and the associated bonds. The System uses the municipality's defined entities to send notifications of these changes as dictated by the terms of the Bond Issue.

FIGS. 4D and 4E describes the secondary bond transaction market without a property transaction.

Do terms allow sale without property? This may occur if the property owner has determined that his property will not increase in value and possibly has decreased significantly in value. The terms of the Bond Issue may allow or prevent a property owner to sell a portion or all of the associated property bonds.

Terms allow new issue to adjust for drop in price? The terms of the Bond Issue may prevent an owner from selling only a portion of the bonds and requesting an adjustment. If prevented the decision is 'No'.

Selling bond or requesting new issue to adjust for drop in value? If the Property Owner is selling the whole bond, then the decision is 'sale'. If the Property Owner is seeking an adjustment in their bond, then the decision is 'adjustment'.

Perform appraisal with fee. The System requests that an appraisal be performed by notifying the specified entity in the Municipality. The fee for this function may be different from the standard appraisal fee. The fee is dictated by the terms of the Bond Issue. The System calculates that fee, accepts payment, records payment, and issues a receipt.

Reissue bond for lower amount. The System calculates the difference in the new bond principal. The terms may not require the municipality to refund the bond principal. The System will place the bonds on the Available List. Another property owner may then purchase the bonds. This may occur due to the economic growth of one area in a large municipality and the deterioration of another. The refunded principal, when paid, is sent to the Tax Payer. This is due to the possibility of a mortgage on the bond. Optionally, the System can notify the Tax Payer, if the Bonds have been sold by the Property Owner, or if the mortgage bond lender reports a default on the bond loan.

Place on Available List. The bonds are placed on the Available List.

Referring now to FIG. 5, miscellaneous bond and property activities are explained. The following are activities performed on request, need, or at regular intervals.

Property Improvements. The terms of the Bond Issue dictate the type and amount of improvements a property owner may perform with or without changes in the associated property taxes. This is usually expressed as a percentage of the property value. If the property improvements exceed those specified in the terms, it may require the purchase of additional bonds to avoid paying taxes. The terms would dictate whether an appraisal would be required, or whether a standard improvement and value table could be used to look up the difference in value.

Change in Use Code. The terms of the Bond Issue can define, and the System supports, the definition of a set of Use Codes. If the terms of the Bond Issue differentiate between a residential property owner who lives in the domicile on a bond associated property versus a residential property owner who rents out the domicile or classifies them as sole proprietor, then the terms may or may not dictate the need to purchase additional bonds to support this activity. The System supports this adjustment.

Bond Status Changes—Repurchasing Bonds. The terms of the Bond Issue dictate when the Municipality can repurchase bonds. Unless otherwise specified, the only bonds that the Municipality will repurchase are those on the Availability List and those associated with properties being sold. The terms of the Bond Issue specify the mechanism the Municipality indicates to the Bond Manager that bonds are to be repurchased.

Available List Maintenance. The Available List keeps track of bonds that are available for purchase. A bond on the Available List may be larger than that desired by a bond purchaser requires. The System supports split bonds, which would result in a partial refund to the current bond owner, and the remainder left on the Available List. However the terms of the Bond Issue may choose not to support this. In this case, the Bond Manager will refund the bond value back from the associated property owner, if this has not already been done, the appropriate size bond will be issued to the purchaser, and the remainder of the bond will be placed back on the Available List.

The Bond has several variations as dictated by the terms of the Bond Issue, the primary one being that the Municipality guarantees refund of a bond. The System supports this by allowing a time interval to be specified as to when the bond will be refunded from the point in time that it was added to the Available List. If the time interval is zero, then the bond is refunded immediately. This process will generate the refund, and make the changes to the bond and property within the Bond Database. It will also generate either an entry in the Database noting a partial abatement of taxes associated with the property, or a partial coupon for the taxes thus abated during the year.

Coupon Issue. The System generates coupons which are sent out every year in time for the taxpayer to put in that year's I.R.S. return. The coupon at a minimum would contain the Bond Issue name, the Bond Identification, the year the tax is abated, the dollar amount of the coupon, the Property Owner's name, address and possibly phone number, the street address, and the property parcel identifier. The System supports customization of the coupon to support required tax regulations such as including the Social Security Number or Federal Tax I.D. of the Property Owner and printing an original plus triplicate copies for the Federal return, the State return, and the tax payer's copy. The original is mailed to the Tax Payer, who may not be the Property Owner, in the case of a mortgage on the bond. The copies are sent to the Property Owner. The System supports partial tax abatement which can occur due to variations in the terms of the Bond Issue. The System records all coupons printed, their destination, and printing date. The System can print reports of all coupons printed for a year, a property or Property Owner. The System can also export a data file containing all the coupons for a tax year with the above information for the purposes of automating the update of the Tax Revenue entity's property tax receivables. The System may be configured to either require the coupon be sent back with the tax bill or automatically update or notify the property tax revenue entity of the municipality.

Closing of the Bond Offering. Eventually the project for which a Bond Issue was created has been completed and the time span in which the Bond issue was to be paid off has past. If the property values have increased (which is usually the case) then Property Owners will retain their bonds. There will be outstanding bonds on an issue that the municipality wants to close. However, most municipalities have ongoing needs and a new Bond Issue may be created. The System allows the introduction of a previous Bond Issue's bonds to be moved over to the new Bond Issue. The process of closure is begun by the old Bond Manager by flagging the master Bond information with a pending closure status and sending a letter to the Property Owner, Tax Payer, and bond mortgage lender of each property of a bond indicating that the Bond is pending closure and their bonds may be moved into another offering. It further states that they will receive a letter at that time indicating any changes.

In addition to the reports and procedures discussed above, the following activities and other reports may be prepared and utilized:

Number and amount of Bonds outstanding,
Properties on which bonds have been issued
Properties on which bonds have not been issued
Value of properties on which bonds have been issued
Value of properties on which bonds have not been issued
Dollar amount of interest related to bonds outstanding
Dollar amount of interest related to properties with no bonds outstanding
Cost of Bonds to Municipality in lost revenue (with actual values and projections based on aging and therefore increased property values).
Projected number of transfers for appraisal scheduling
Associated Properties with Bonds
Projected revenue loss report
Bond Ledger
Bond Balance Sheet
Bond Waiting List
Bond Availability List
Aging report on Available List
Aging report on Waiting List
Pending Transfer Requests in the Waiting List
Scheduled Appraisals by date
Projected bond transfers in dollars, property types, and number of properties.
Projected earnings for transfer costs.
List bonds by purchase date (aging report).
Projected transfer/sales based on demand (home building) and economic per capita growth.

These statistics can be built based on cost of home, percentage of income levels, age of owner (from date of birth), whether the property is being rented (use code), type of bond (Corporation, Sole Proprietorship, residential), zoning, work at home permits or business licenses, employer and possibly the determination of whether there are children in the household.

Summary Account Statements showing bonds sold, repurchased, availability, and waiting list.

Account Statements showing monetary transactions on accounts between municipality and Bond Manager including any interest earned on the account Projected impact statement (loss of business in the area: Bond wait list, lost revenue).

A data processing system for creating and administering a bond issue is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A method of creating and administering a bond issue by a bond manager for a municipal taxing authority of a community, comprising the steps of:

(a) using a computer to store and process data in a database, the database being configured to store for retrieval selected information regarding creation and administration of the bond issue;

(b) storing and processing data representing information needed to determine bond utilization in the community governed by the municipal taxing authority, said step of storing and processing data comprising the steps of:

(i) analyzing support for the bond issue in the community, (ii) forecasting the length of time of property ownership, (iii) determining terms for issuance of the bonds, (iv) projecting municipality growth, expenditures, tax base, population and other indicators including inflation and unemployment rates, (v) utilizing the data determined in (iv) to determine estimates of future property values and municipal property taxes, and (vi) utilizing the information contained in (i)–(v) to determine an offering price for the bond;

(c) storing and processing data representing information about a specific real estate purchaser, the real estate to be purchased, the use to which the real estate will be put, and projected purchaser income and income growth to predict whether participation in a primary bond issue would be financially beneficial to the purchaser;

(d) storing and processing data representing information about the condition of the bond issue to enable the bond manager and the municipal taxing authority to determine the capacity of the municipal taxing authority to repurchase bonds from real estate sellers;

(e) storing and processing data representing taxes serviced by the bond issue;

(f) storing and processing data representing improvements made to the property and whether those improvements require a change in the tax value of the property; and (g) storing and processing data representing conditions for closing the bond issue.

* * * * *